(12) United States Patent
Caprioli et al.

(10) Patent No.: US 11,048,516 B2
(45) Date of Patent: Jun. 29, 2021

(54) SYSTEMS, METHODS, AND APPARATUSES FOR LAST BRANCH RECORD SUPPORT COMPATIBLE WITH BINARY TRANSLATION AND SPECULATIVE EXECUTION USING AN ARCHITECTURAL BIT ARRAY AND A WRITE BIT ARRAY

(71) Applicants: Paul Caprioli, Hillsboro, OR (US);
Koichi Yamada, Los Gatos, CA (US);
Jason M. Agron, San Jose, CA (US);
Jiwei Lu, Pleasanton, CA (US)

(72) Inventors: Paul Caprioli, Hillsboro, OR (US);
Koichi Yamada, Los Gatos, CA (US);
Jason M. Agron, San Jose, CA (US);
Jiwei Lu, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 14/752,891

(22) Filed: Jun. 27, 2015

(65) Prior Publication Data
US 2016/0378498 A1 Dec. 29, 2016

(51) Int. Cl.
*G06F 9/38* (2018.01)
*G06F 9/30* (2018.01)

(52) U.S. Cl.
CPC ........ *G06F 9/3804* (2013.01); *G06F 9/30101* (2013.01)

(58) Field of Classification Search
CPC .............. G06F 9/3804; G06F 9/30101; G06F 9/30054; G06F 9/30058; G06F 9/30061;
(Continued)

(56) References Cited

U.S. PATENT DOCUMENTS 4,775,978 A * 10/1988 Hartness ............. G06F 11/1008
714/770
2003/0161172 A1* 8/2003 Civlin ................. G06F 9/30134
711/132
(Continued)

FOREIGN PATENT DOCUMENTS

EP 2889769 B1 * 5/2017 ............. G06F 9/467

OTHER PUBLICATIONS

Patterson, David A., and John L. Hennessy, "Computer Organization and Design: The Hardware/Software Interface", 2004, Morgan Kaufmann, n.d. Print., 3rd Edition, Pertient Pages: (xiv, 52, 418).*

*Primary Examiner* — Keith E Vicary
(74) *Attorney, Agent, or Firm* — Nicholson De Vos Webster & Elliott LLP

(57) ABSTRACT

Systems, methods, and apparatuses for last branch record support are described. In an embodiment, a hardware processor core comprises a hardware execution unit to execute a branch instruction, at least two last branch record (LBR) registers to store a source and destination information of a branch taken during program execution, wherein an entry in a LBR register is to include an encoding of the branch, a write bit array to indicate which LBR register is architecturally correct, an architectural bit array to indicate when an LBR register has been written, and a plurality of top of stack pointers to indicate which LBR register in a LBR register stack is to be written.

14 Claims, 13 Drawing Sheets

(58) Field of Classification Search
CPC .... G06F 9/3806; G06F 9/3808; G06F 9/3844; G06F 9/3846; G06F 9/3848; G06F 9/3861; G06F 9/466; G06F 9/467; G06F 9/528

See application file for complete search history.

(56) References Cited

U.S. PATENT DOCUMENTS

| | | | | |
|---|---|---|---|---|
| 2007/0136565 | A1* | 6/2007 | Lambrache | G06F 9/322 712/244 |
| 2012/0030518 | A1* | 2/2012 | Rajwar | G06F 11/3476 714/38.13 |
| 2012/0311307 | A1* | 12/2012 | Chynoweth | G06F 9/30054 712/234 |
| 2013/0283249 | A1* | 10/2013 | Kanhere | G06F 8/40 717/139 |
| 2013/0326201 | A1* | 12/2013 | Gopal | G06F 9/30043 712/225 |
| 2014/0129804 | A1* | 5/2014 | King | G06F 9/30109 712/30 |
| 2014/0372734 | A1* | 12/2014 | Greathouse | G06F 9/3005 712/237 |
| 2015/0067763 | A1* | 3/2015 | Dalcher | G06F 21/554 726/1 |

* cited by examiner

| BRANCH TYPE | ENCODING | DESCRIPTION |
|---|---|---|
| NON-NATIVE | 0 | NOT PRESENT DO NOT RECORD |
| JCC | 1 | CONDITIONAL BRANCH |
| NEAR_REL_CALL | 2 | NEAR RELATIVE CALL |
| NEAR_IND_CALL | 3 | NEAR INDIRECT CALL |
| NEAR_RET | 4 | NEAR RETURN |
| NEAR_IND_JMP | 5 | NEAR INDIRECT JUMP |
| NEAR_REL_JMP | 6 | NEAR RELATIVE JUMP |
| FAR_BRANCH | 7 | FAR BRANCH |

FIG. 4

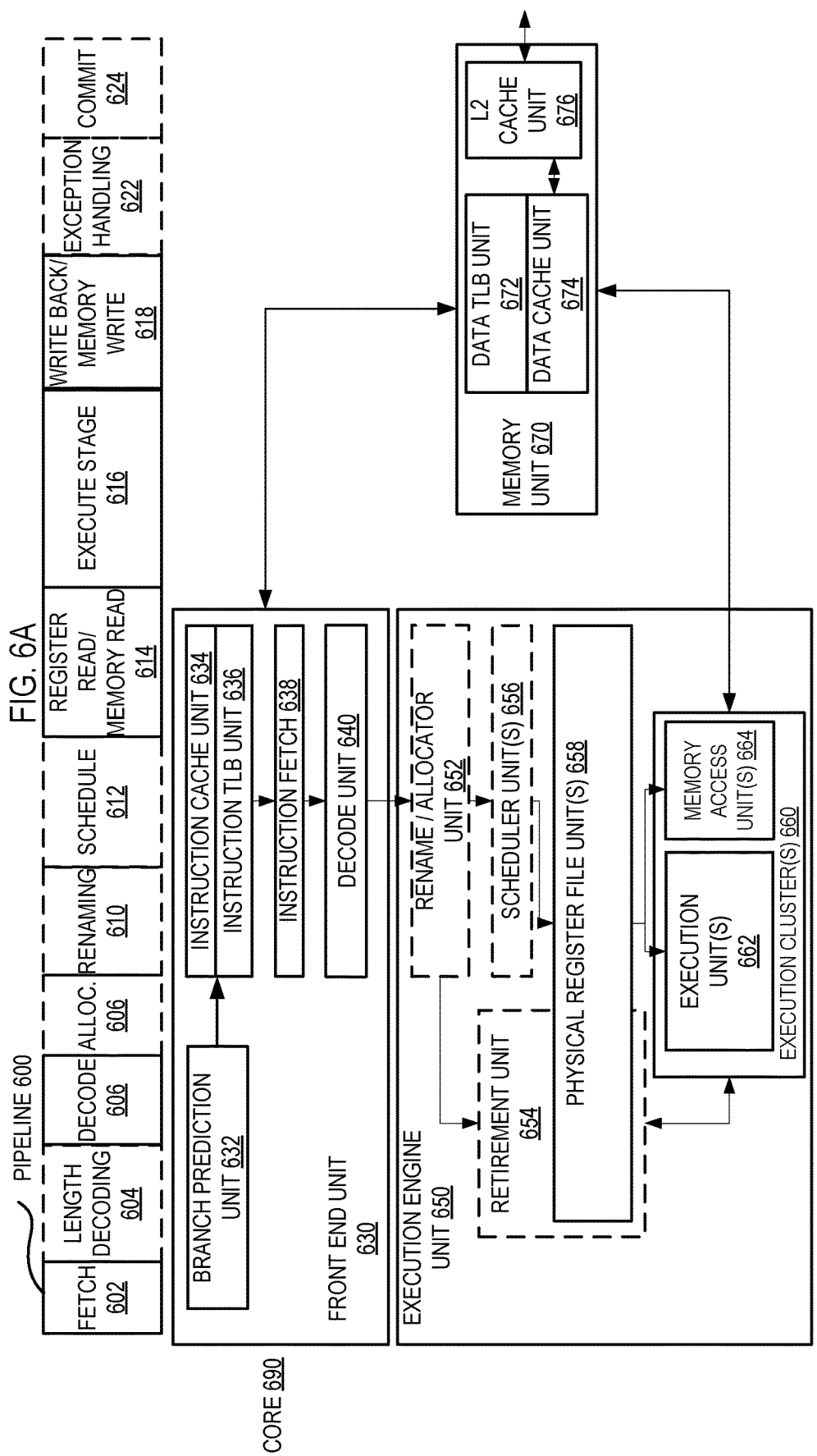

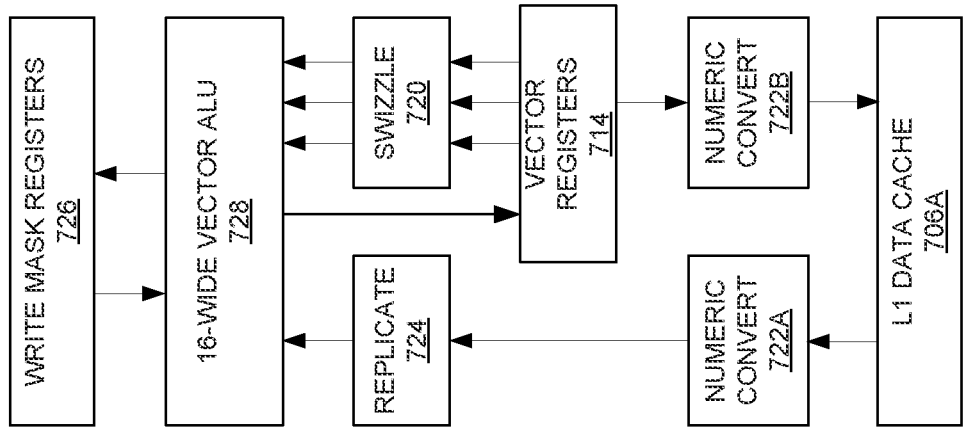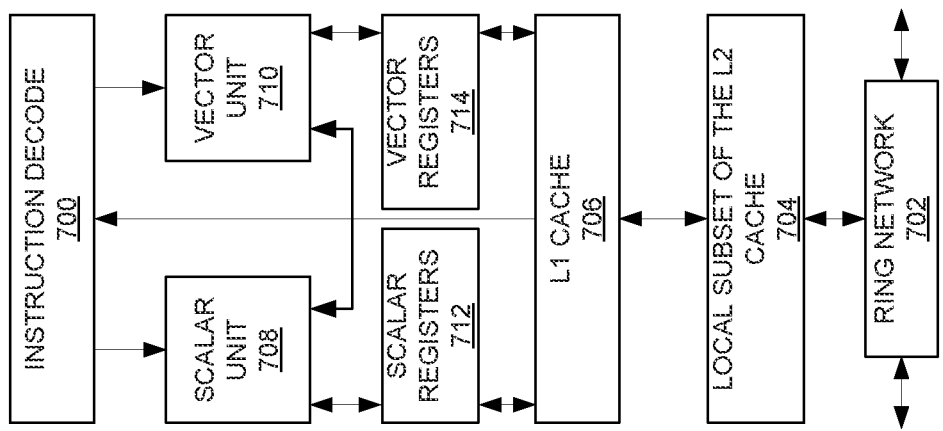

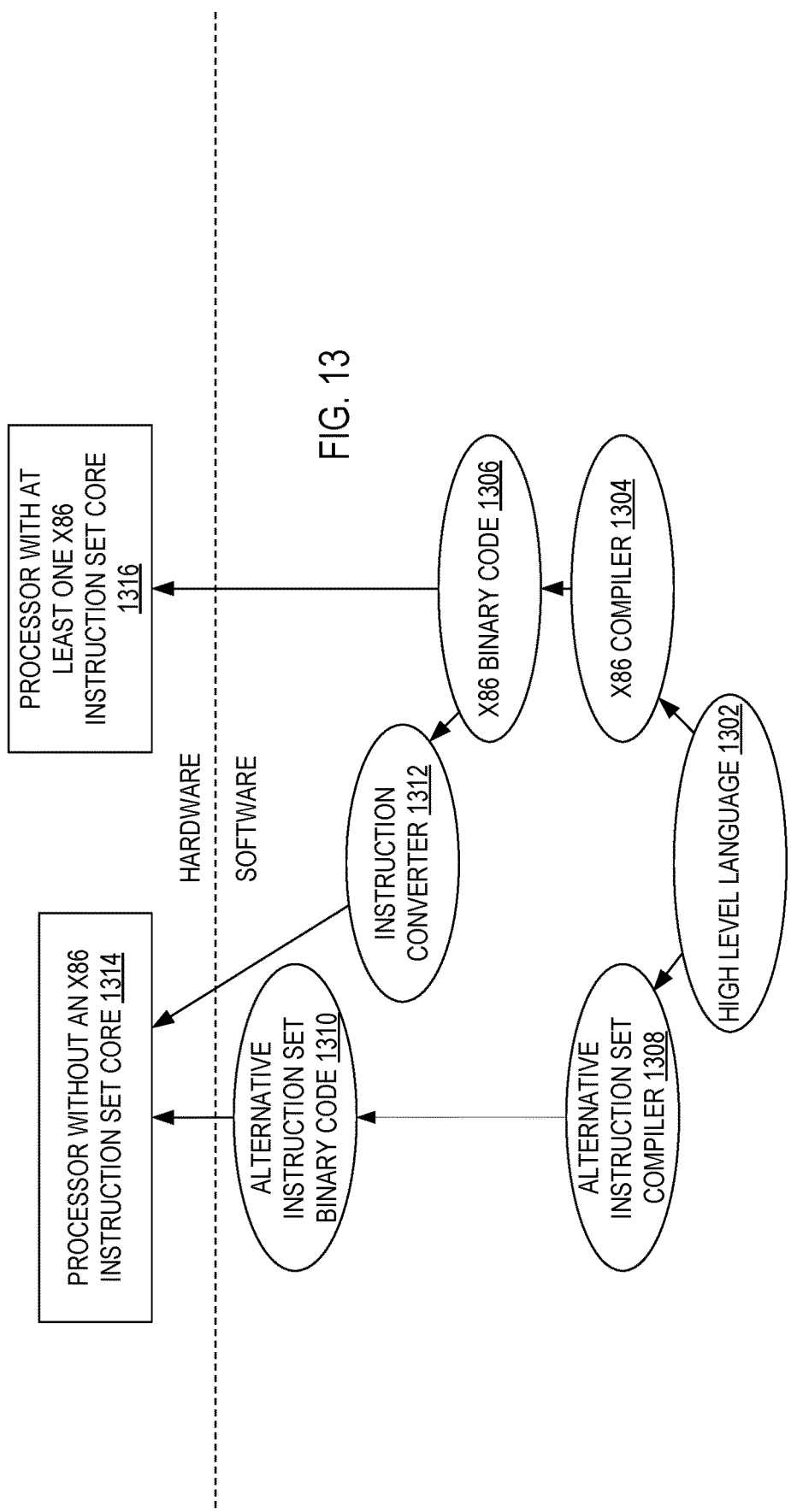

SYSTEMS, METHODS, AND APPARATUSES FOR LAST BRANCH RECORD SUPPORT COMPATIBLE WITH BINARY TRANSLATION AND SPECULATIVE EXECUTION USING AN ARCHITECTURAL BIT ARRAY AND A WRITE BIT ARRAY

FIELD

The various embodiments described herein relate to processor architecture.

BACKGROUND

Last Branch Record (LBR) support allows for users to obtain information about the last N branches executed on the processor. Operating systems are often deployed in production with this recording feature enabled in order to diagnose unexpected software failures.

BRIEF DESCRIPTION OF THE DRAWINGS

The present invention is illustrated by way of example and not limitation in the figures of the accompanying drawings, in which like references indicate similar elements, and in which:

FIG. 4 illustrates an embodiment of encoding of branch types for both kinds of LBR entries.

FIG. 6A is a block diagram illustrating both an exemplary in-order pipeline and an exemplary register renaming, out-of-order issue/execution pipeline according to embodiments of the invention.

FIG. 6B is a block diagram illustrating both an exemplary embodiment of an in-order architecture core and an exemplary register renaming, out-of-order issue/execution architecture core to be included in a processor according to embodiments of the invention.

FIGS. 7A-B illustrate a block diagram of a more specific exemplary in-order core architecture, which core would be one of several logic blocks (including other cores of the same type and/or different types) in a chip.

FIG. 13 is a block diagram contrasting the use of a software instruction converter to convert binary instructions in a source instruction set to binary instructions in a target instruction set according to embodiments of the invention.

DETAILED DESCRIPTION

Figure 1:
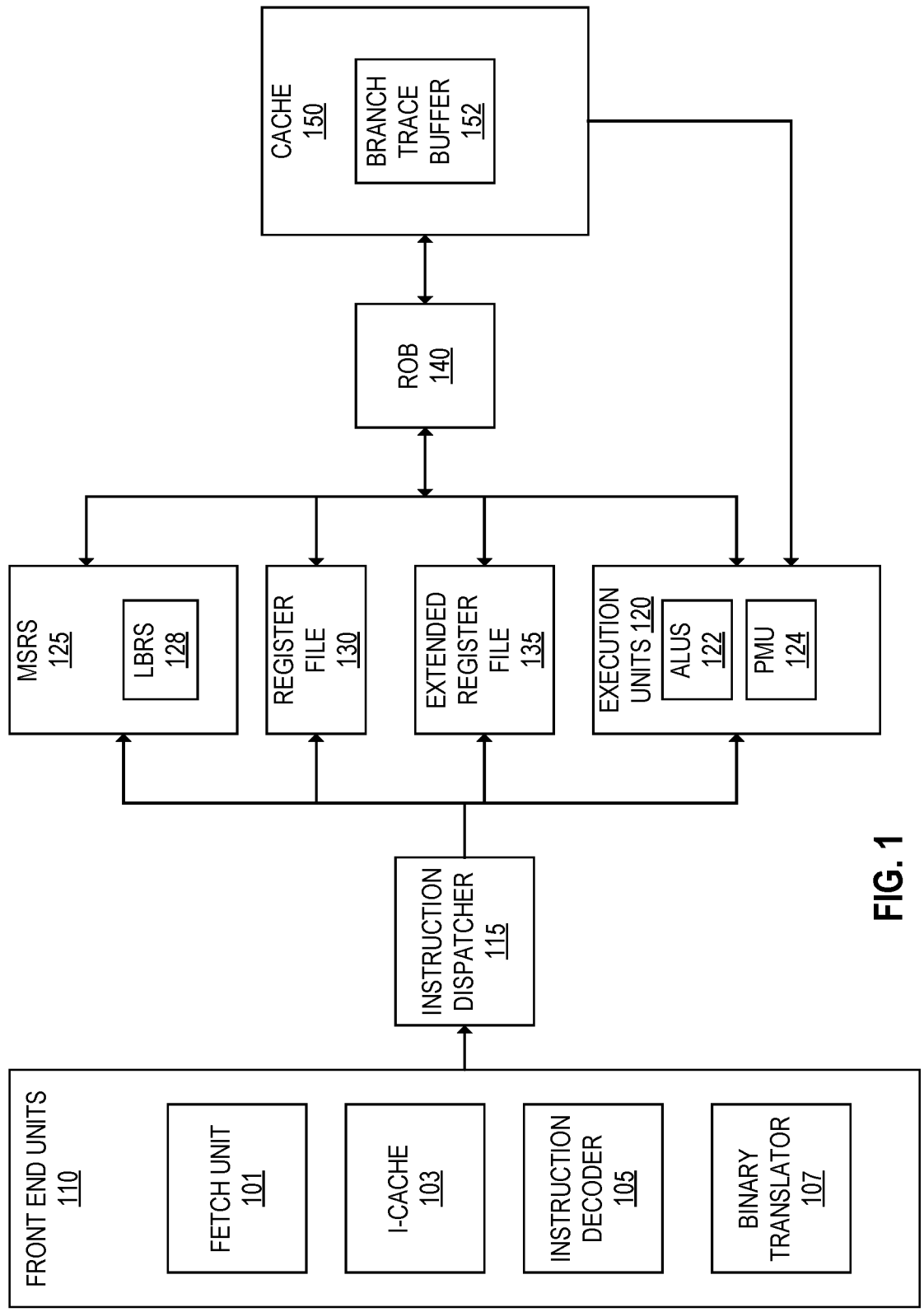
FIG. 1 illustrates an embodiment of a processor core.

In the following description, numerous specific details are set forth. However, it is understood that embodiments of the invention may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In various embodiments, branch information obtained during execution of a program can be recorded and then used for purposes of profiling, debugging and/or optimization of transactional memory transactions. In this way, improved transactional memory operation and code can be realized. In various embodiments, the information included in such registers may include last branch information, in which information regarding branches taken during program execution can be recorded. In addition to the identification of such branches, information regarding execution of a pending transaction of a transactional memory can also be recorded. Using this information, debugging and other operations can be realized for transactional memory transactions.

Transactional execution usually includes grouping a plurality of instructions or operations into a transaction, atomic section, or critical section of code. In some cases, the term instruction refers to a macro-instruction which is made up of a plurality of operations, while in other cases an instruction can refer to a smaller operation, e.g., a micro-operation (uop). There are commonly two ways to identify transactions. The first example includes demarcating the transaction in software. Here, some software demarcation is included in code to identify a transaction. In another embodiment, which may be implemented in conjunction with the foregoing software demarcation, transactions are grouped by hardware or recognized by instructions indicating a beginning of a transaction and an end of a transaction.

In a processor, a transaction is executed either speculatively or non-speculatively. In the second case, a grouping of instructions is executed with some form of lock or guaranteed valid access to memory locations to be accessed. In the alternative, speculative execution of a transaction is more common, where a transaction is speculatively executed and committed upon the end of the transaction. A pendency of a transaction, as used herein, refers to a transaction that has begun execution and has not been committed or aborted, i.e., pending.

Typically, during speculative execution of a transaction, updates to memory are not made globally visible until the transaction is committed. While the transaction is still pending, locations loaded from and written to a memory are tracked. Upon successful validation of those memory locations, the transaction is committed and updates made during the transaction are made globally visible. However, if the transaction is invalidated during its pendency, the transaction is restarted without making the updates globally visible.

In various embodiments last branch recording facilities may be provided in a processor. Such facilities may store branch records in a set of registers, which one embodiment may be machine or model specific registers (MSRs). For example, a processor may include a last branch record (LBR) stack of MSRs for storing information regarding the most recently taken branches. A branch record includes a pair of registers, one of which to store a branch-from instruction address and a branch-to instruction address which may be linear addresses, in one embodiment. In some implementations, the registers may be automatically read, while in other embodiments, a control signal may cause the stack to send branch records as branch trace messages (BTMs) to a selected destination location.

Note that operation of LBR registers can be controlled to be enabled or disabled. For example, an LBR flag may be present in a debug control MSR to enable the processor to automatically record branch records for taken branches. Note that in some embodiments, in addition to LBRs, information regarding interrupts and exceptions can also be recorded in the LBR registers, although in other embodiments separate recording facilities may be provided for such situations.

In one embodiment, a debugger can use addresses in a LBR stack to enable a backward trace from the manifestation of a particular bug toward its source.

Note that the number of MSRs in the LBR stack can vary in different embodiments. For example, in different implementations, the size of the LBR stack may be 4, 8 or 16, although the scope of the present invention is not limited in this regard. As described above, last branch recording mechanisms may track not only branch instructions (like jumps, loops and call instructions), but also other operations that cause a change in the instruction pointer (like external interrupts, traps and faults).

FIG. 1 illustrates an embodiment of a processor core. As shown in FIG. 1, processor core 100 may be a multi-stage pipelined out-of-order processor. Processor core 100 is shown with a relatively simplified view in FIG. 1 to illustrate various features used in connection with branch record reporting in accordance with an embodiment of the present invention. Further, understand that as described above a processor may or may not provide hardware support for TM transactions. For sake of illustration assume that core 100 includes such hardware support. However, in some embodiments using transactional status information stored in LBRs, even in the absence of such hardware support, analysis of transaction execution can occur. In this way, an understanding of what branches occur during a transaction, whether a branch causes a transaction to abort or so forth, can be obtained. Then debug, optimization, profiling or other activities can occur with this information.

As shown in FIG. 1, core 100 includes front end units 110, which may be used to fetch instructions to be executed and prepare them for use later in the processor. For example, front end units 110 may include a fetch unit 101, an instruction cache 103, and an instruction decoder 105. In some implementations, front end units 110 may further include a trace cache, along with microcode storage as well as a micro-operation storage. Fetch unit 101 may fetch macro-instructions, e.g., from memory or instruction cache 103, and feed them to instruction decoder 105 to decode them into primitives, i.e., micro-operations for execution by the processor. In some embodiments, a binary translator (BT) 107 provides translation between a native instruction set architecture (ISA) to a second ISA such that translated instructions of the second ISA can execute in the core.

Coupled between front end units 110 and execution units 120 is an instruction dispatcher 115 which can be implemented as out-of-order logic in out-of-order implementations to receive the micro-instructions and prepare them for execution. More specifically instruction dispatcher 115 may include various buffers to allocate various resources needed for execution, as well as to provide renaming of logical registers onto storage locations within various register files such as register file 130 and extended register file 135. Register file 130 may include separate register files for integer and floating point operations. Extended register file 135 may provide storage for vector-sized units, e.g., 256 or 512 bits per register.

As further seen in FIG. 1, processor 100 may include a set of MSRs 125. As discussed above, various types of model specific information may be stored in such registers. In the embodiment of FIG. 1, shown is a set of LBRs 128 which as discussed above may store information regarding branches taken during execution of code. These or similar registers may further include information regarding other execution occurrences such as interrupts, traps, exceptions and so forth. In some embodiments, a last branch record top-of-stack (TOS) pointer stores a pointer to the MSR in the LBR stack that contains the most recent branch, interrupt, or exception recorded.

Various resources may be present in execution units 120, including, for example, various integer, floating point, and single instruction multiple data (SIMD) logic units, among other specialized hardware. For example, such execution units may include one or more arithmetic logic units (ALUs) 122. In addition, execution units may further include a performance monitoring unit (PMU) 124. In various embodiments, PMU 124 may be used to control obtaining of various information, e.g., profiling counters, information in MSRs and so forth. In particular implementations here, PMU 124 or other such logic may be used to control recording of information, including information regarding transaction execution in LBR 128 and to further obtain such information for further use. Results may be provided to retirement logic, namely a reorder buffer (ROB) 140. More specifically, ROB 140 may include various arrays and logic to receive information associated with instructions that are executed. This information is then examined by ROB 140 to determine whether the instructions can be validly retired and result data committed to the architectural state of the processor, or whether one or more exceptions occurred that prevent a proper retirement of the instructions. Of course, ROB 140 may handle other operations associated with retirement.

As shown in FIG. 1, ROB 140 is coupled to a cache 150 which, in one embodiment may be a low level cache (e.g., an L1 cache) although the scope of the present invention is not limited in this regard. As seen, cache 150 in one embodiment may include a branch trace buffer 152 that may store branch information, e.g., received from LBRs 128. For example, PMU 124 may control the creation and sending of branch target messages from LBR 128 to branch trace buffer 152. From here, the information may be accessed, e.g., via a profiler optimizer or so forth to enable analysis of information regarding transaction execution in accordance with an embodiment of the present invention. Also, execution units 120 can be directly coupled to cache 150. While shown with this high level in the embodiment of FIG. 1, understand the scope of the present invention is not limited in this regard.

Hardware and software co-designed binary translation (BT) technologies upset traditional LBR support by making major modifications to the currently executing code. This may not only break existing software which depends on LBR data, but would also lead to security issues if end-users were allowed to monitor the translated code. Embodiments detailed herein provide micro-architectural support to allow binary translation systems to faithfully emulate LBR monitoring services in a transparent fashion—so as to hide any changes made by the binary translation system and to ensure full compatibility with non-BT systems.

For the sake of explanation, the below discussion involves translating from a native ISA into another, translated ISA (tISA) using, for example, BT. In many cases translated code in tISA will contain a branch that corresponds to a branch in native code. In some cases, a branch in native code may be elided (e.g. BT may observe that a branch is never taken, omit the branch, and create an assertion in translated code attesting to this). And, in some cases, there may be a branch in translated code that was not present in the original native ISA (e.g. branches may be inserted for BT management reasons).

Figure 2:
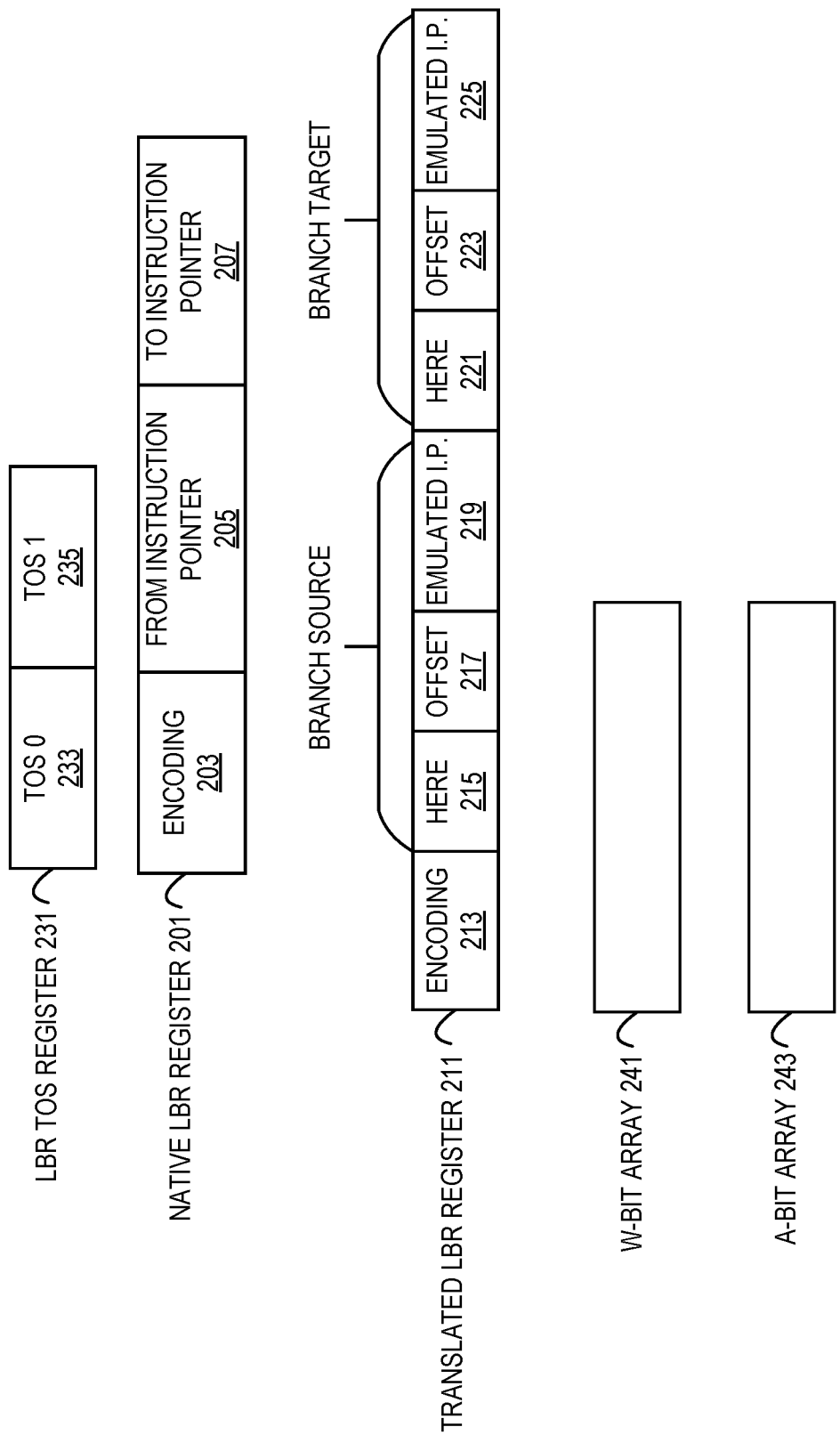
FIG. 2 illustrates registers compatible with binary translation.

FIG. 2 illustrates registers compatible with binary translation. An LBR register may store "native" information or translated information as shown. Each LBR register can contain data for either an x86 branch or a tISA branch. Typically, there are 2*N LBR data registers, that comprise two arrays of length N (named LBR-0 and LBR-1 in this example).

A native LBR register entry 201 includes fields for encoding 203 (detailed below with respect to FIG. 4), a from instruction pointer (address) 205, and a to instruction pointer (address) 207. The "from" address is a source address of a recent branch, namely the "from" address at which a branch occurs. The "to" address stores a destination address, namely a "to" address to which control is passed by the branch. Thus, in one embodiment, each branch record includes two linear addresses, which represent the "from" and "to" instruction pointers for a branch, interrupt, or exception. The contents of the "from" and "to" addresses may differ, depending on the source of the branch. Where the record is for a taken branch, the "from" address is the address of the branch instruction and the "to" address is the target instruction of the branch. Where the record is for an interrupt, the "from" address is the return instruction pointer (RIP) saved for the interrupt and the "to" address is the address of the first instruction in the interrupt handler routine. The RIP is the linear address of the next instruction to be executed upon returning from the interrupt handler. Where the record is for an exception, the "from" address is the linear address of the instruction that caused the exception to be generated and the "to" address is the address of the first instruction in the exception handler routine.

A translated LBR register entry 211 records for both a branch source and target: a "here" value 215, 221 which is a register that stores a value that corresponds to which translated instruction was executed (e.g., an offset into a translation cache of where the translation was entered at which provides the translation to look at to use the offset properly (this is a translation descriptor retrieval mechanism); an offset 217, 223 which is a physical address into a translated code cache (concealed memory) (tISA IP—HERE); and an emulated native instruction pointer at the time of the branch 219, 225 (e.g., emulated native RIP at time of branch). This tISA entry 211 provides enough information to "reconstruct" or "recover" native LBR data. When an attempt is made to read a tISA entry, hardware traps to the BT runtime layer, which converts the tISA entry to an native entry. It is able to do this using the data recorded in the tISA entry together with its own internal data structures. Note that a single trap to the BT runtime may be used to convert all of the tISA entries in order to avoid subsequent traps (in anticipation that the other entries will also be soon read). Also, note that if the BT runtime wishes to modify any internal data that is necessary for native LBR reconstruction, e.g. BT wishes to perform garbage collection, it first converts any existing tISA LBR entries.

Like the native LBR register entry 201, the translated LBR register entry 211 includes an encoding of branch types 213. An embodiment of encoding of branch types for both kinds of LBR entries is found in FIG. 4. Note that branches inserted by BT that are not present in the original ISA are set to NON_NATIVE in tISA so that they are never recorded in LBRs.

LBRs allow for configurable filtering of what types of branches are recorded. Since translation may alter the type of branch, tISA is architected to include a branch type field, which indicates the type of the original native branch that the tISA branch is executing. For example, both a near relative call in the original native ISA or a near relative jump in the original native ISA may be translated to a tISA branch. So, the tISA branch instruction contains a field encoding the original native branch type so that hardware may filter based on this field and its current configuration.

There are at least two LBR top of stack (TOS) registers 231 to store a pointer to the MSR in the LBR stack that contains the most recent branch, interrupt, or exception recorded. The entries of the LBR array are read by software in a circular fashion. To accommodate BT, having TOS_0 and TOS_1, two registers 233 and 235 store this information.

Additionally, there are two bit arrays, one for write (W) bits 241 and one for architectural (A) bits 243. Each of these arrays contains N bits. The A-bits indicate, for each LBR register, which of LBR-0 or LBR-1 contains the architecturally correct LBR. The W-bits indicate, for each LBR register, whether the other LBR register (not the LBR indicated by the A-bit) has been speculatively written. All of these structures are initialized to 0 at power on.

In some instances, BT may reverse the polarity of a branch, i.e. blocks of code may be reorganized so that a taken branch is translated into a not-taken branch and vice-versa. So that LBR hardware may properly record such branches, in some embodiments, a polarity inversion bit field is added to a tISA branch instruction.

Additionally, to account for elided native branches, a tISA instruction named branch_nop accounts for these branches. This instruction marks the location within tISA at which a native ISA branch would have executed and creates an LBR record as appropriate (based on the current LBR configuration). This instruction does not alter the control flow of the executing tISA code. Alternatively, branch_nop functionality may be combined with another tISA instruction to improve code density. An example would be including branch_nop functionality with a tISA assertion instruction.

Figure 3:
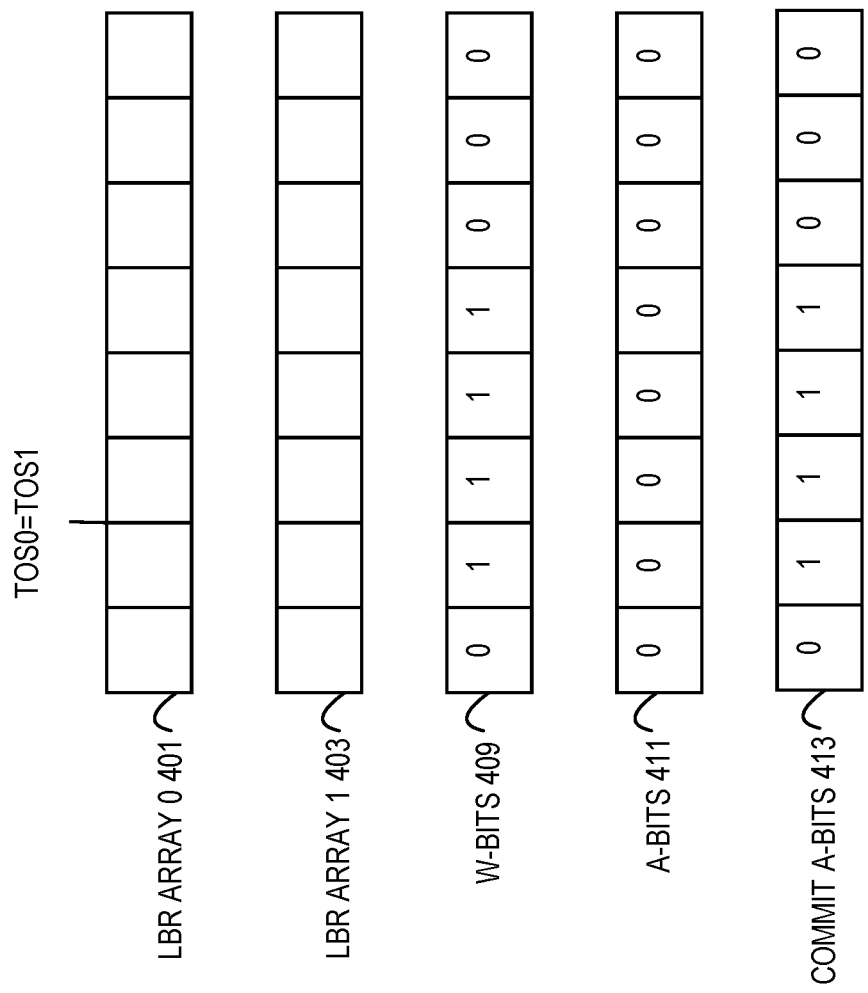
FIG. 3 illustrates an example of handling speculative execution.

FIG. 3 illustrates an example of handling speculative execution. In order to aggressively optimize, translated code may employ atomic code regions and the ability of hardware to either block commit the region or roll it back (undo it) in its entirety.

An easier to understand case of LBR usage involves only executing native instructions. In this scenario, the LBR structures may be as follows: 1) TOS_0=1, indicating that the second LBR data register is the top of the stack; 2) all the write array W-bits are zero, indicating that no LBR registers have been written speculatively; and 3) all the architectural array A-bits are zero, indicating that LBR-0 contains the LBR data records. Continuing in native mode, the A-bits and the W-bits would remain zero, LBR-0 entries would be written in a circular fashion, and TOS_0 would advance with each record that is written, wrapping around upon reaching the value N.

In a speculative execution scenario, upon entering a speculative block of code (e.g., with the execution of an XBEGIN instruction), the value of the TOS register TOS_0 is copied to the register for TOS_1 as shown in the figure. Then, suppose four branches are encountered. These branches are written in the LBR data registers 403, the LBR array not indicated by the A-bits (shown in 411). In this example, these four branches are written to LBR-1. For each branch written, the corresponding W-bit is set to 1 (shown in 409) and TOS_1 is advanced. When the end of the atomic region of code is reached (such as marked with XEND), what occurs is dependent upon if the atomic region is to be committed. If the region is committed, the A-bit array is bitwise XORed with the W-bit array and itself (shown in 413). Then the W-bit array is cleared. Finally, TOS_1 is copied to TOS_0. If, instead, the region is to be rolled back, i.e. the atomic region fails to commit, the W-bit array is cleared, leaving TOS_0 and the A-bit array (shown as 411) unchanged.

Figure 5:
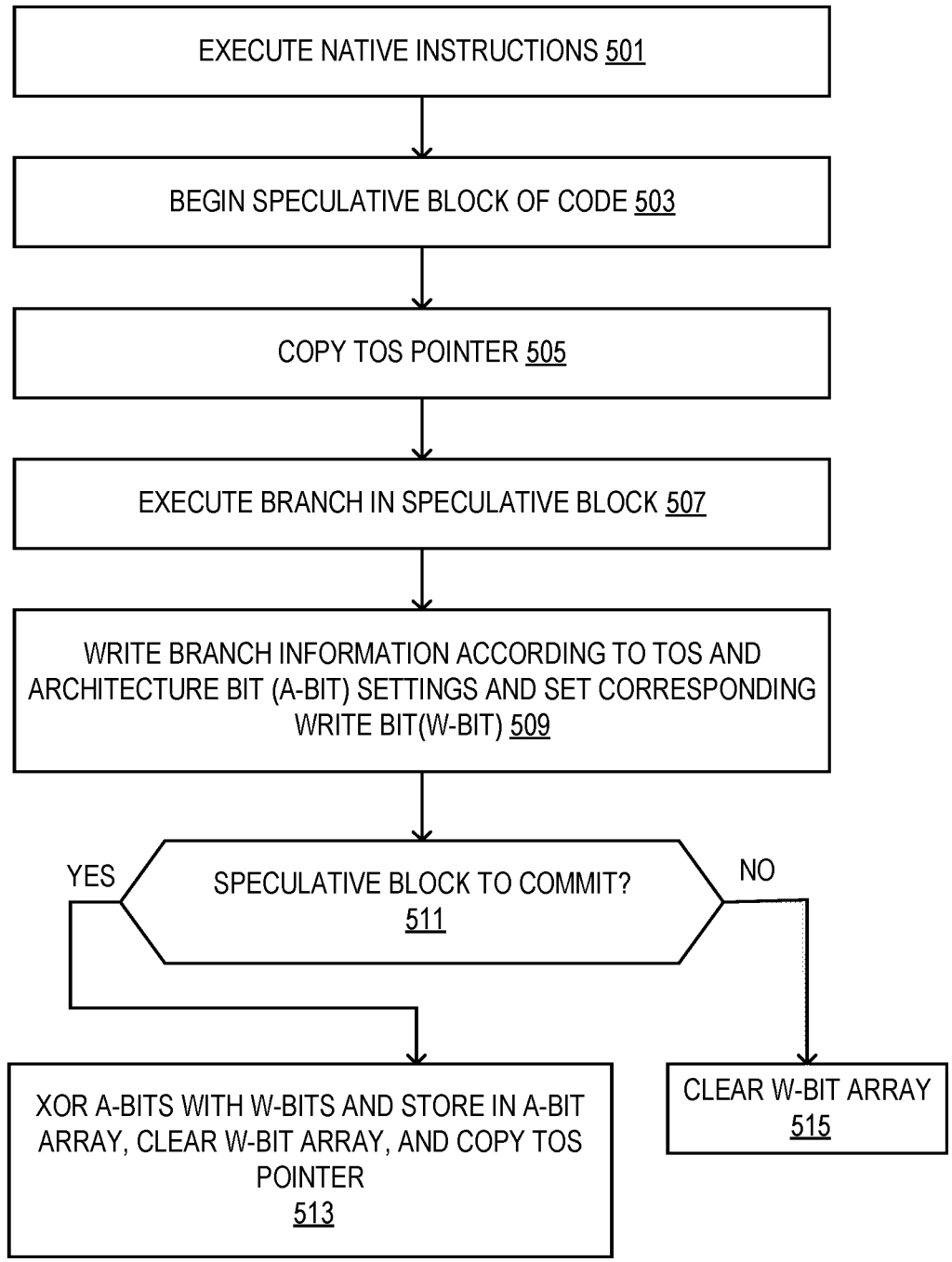
FIG. 5 illustrates an embodiment of a method of LBR usage in a processor

FIG. 5 illustrates an embodiment of a method of LBR usage in a processor.

At 501, native instructions are executed.

At some point later in time, a speculative block of code is begin at 503. For example, an XBEGIN instruction is executed.

The top of stack (TOS) pointer is copied from a first TOS register to a second TOS register at 505. For example, TOS_0 is copied to TOS_1. At this point, if the speculation does not commit, the TOS_0 can be used as if nothing happened to point to the proper LBR register.

A branch is executed in the speculative block at 507. The branch information is written into an appropriate LBR according to the TOS (the pointer indicates which LBR of the stack to write to) and the architectural bit (A-bit) settings that align with that TOS. Additionally, a corresponding W-bit is set in the write bit array at 509. This LBR entry will have an encoding and source and destination information as detailed above depending upon what type of branch (native or tISA is executed).

At a point later in time, a determination of if the speculative block is to commit is made at 511. For example, has an XEND been executed. If no, then the write bit array is cleared at 515. If yes, then the architectural array is exclusive ORed (XORed) with the write bit array and stored as the architectural array (A=A XOR W), the write bit array is then cleared, and the TOS pointer is copied from TOS_1 to TOS_0 at 513.

In summary, hardware controls the above describe LBR structures as follows. 1) For reading the LBR entry i, the entry is read from LBR-(A[i])[i]. When the entry is tISA, a trap to BT runtime is made to convert to a native entry and the native entry is returned to software. 2) For recording branches in normal (non-speculative) mode, LBR data is written to LBR-(A[TOS_0])[TOS_0] and TOS_0 is advanced. 3) Upon entering a speculative region (e.g., upon executing an XBEGIN instruction), TOS_0 is copied to TOS_1. 4) To record branches in speculative mode, LBR data is written to LBR-(~A[TOS_1])[TOS_1], an entry in the write array W[TOS_1] is set, and TOS_1 is advanced. 5) Upon a speculation failure (roll-back), the bits of the write array are cleared. 6) Upon a speculation commit, the architectural array entries are XORed with the write array entries (A[i] to XOR(A[i], W[i]) for all i), the write array is cleared, and TOS_1 is copied to TOS_0. In some alternative embodiments, TOS_0 and TOS_1 can be managed with a single A-bit and a single W-bit rather than copying data between them. But since the TOS registers are small (e.g., 8 bits each) copying between them is acceptable.

The above allows for LBRs to be recorded for speculative branches and rolled back if speculation fails in order to fully support transactional execution and does this without ever copying the LBR records between registers.

The hardware mechanism described above can be used whenever it is desirable to create a log of data that is speculative and at the same time hide its speculative nature.

Embodiments detailed herein may be executed on many different architectures including those detailed below.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) applications. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file unit(s) 658. Each of the physical register file units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file unit(s) 658 comprises a vector registers unit, a write mask registers unit, and a scalar registers unit. These register units may provide architectural vector registers, vector mask registers, and general purpose registers. The physical register file unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file unit(s) 658, and execution cluster(s) 660 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die ring interconnect network 702 and with its local subset of the Level 2 (L2) cache 704 according to embodiments of the invention. In one embodiment, an instruction decoder 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative embodiments of the invention may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes a part of the L2 cache 706A as well as more detail regarding the vector unit 710 and the vector registers 714. Specifically, the vector unit 710 is a 16-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B and replication with replication unit 724 on the memory input. Write mask registers 726 allow predicating resulting vector writes.

Processor with Integrated Memory Controller and Graphics

Figure 8:
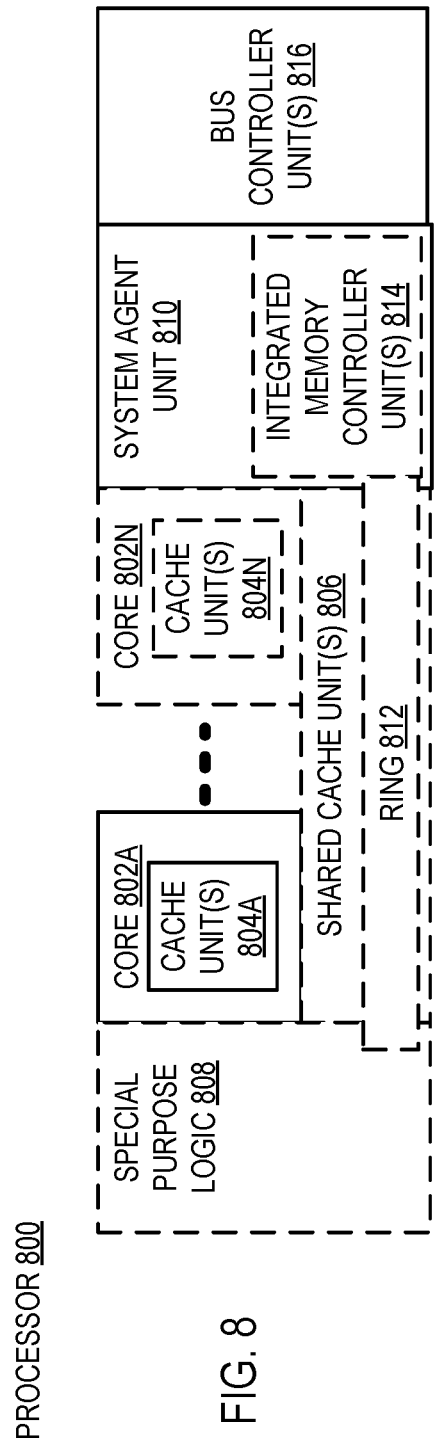
FIG. 8 is a block diagram of a processor 800 that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the special purpose logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802A-N.

In some embodiments, one or more of the cores 802A-N are capable of multi-threading. The system agent 810 includes those components coordinating and operating cores 802A-N. The system agent unit 810 may include for example a power control unit (PCU) and a display unit. The PCU may be or include logic and components needed for regulating the power state of the cores 802A-N and the special purpose logic 808. The display unit is for driving one or more externally connected displays.

The cores 802A-N may be homogenous or heterogeneous in terms of architecture instruction set; that is, two or more of the cores 802A-N may be capable of execution of the same instruction set, while others may be capable of executing only a subset of that instruction set or a different instruction set.

Exemplary Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
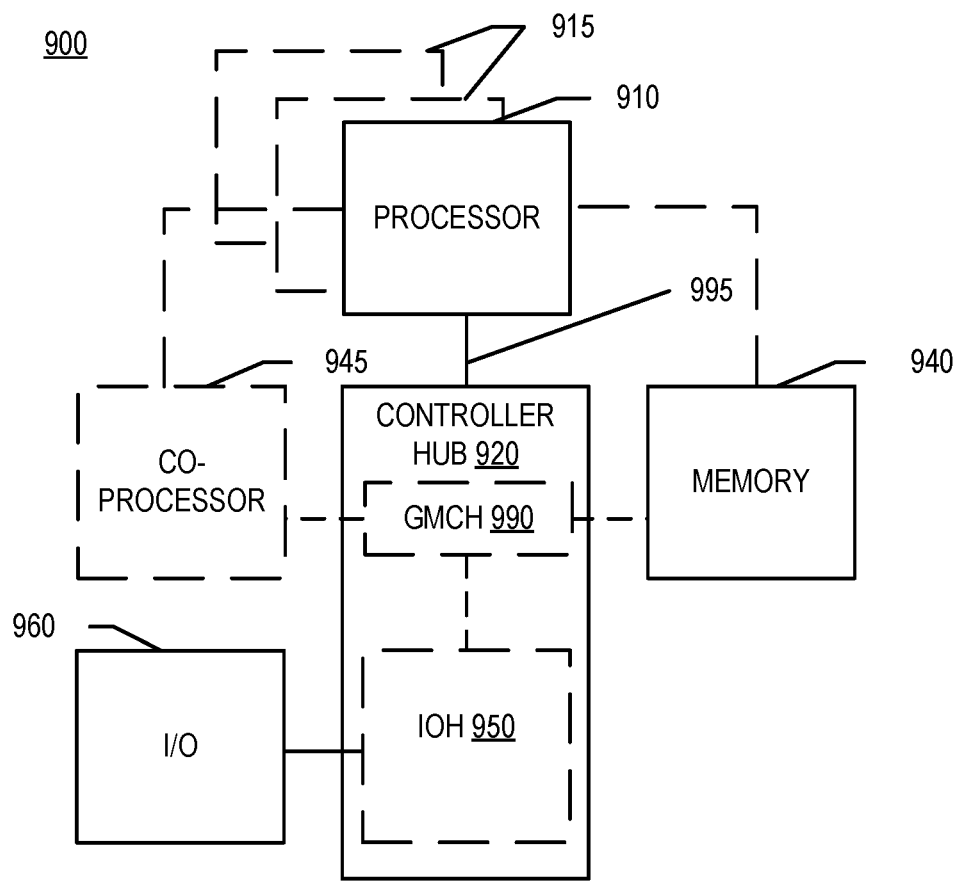
FIGS. 9-12 are block diagrams of exemplary computer architectures.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
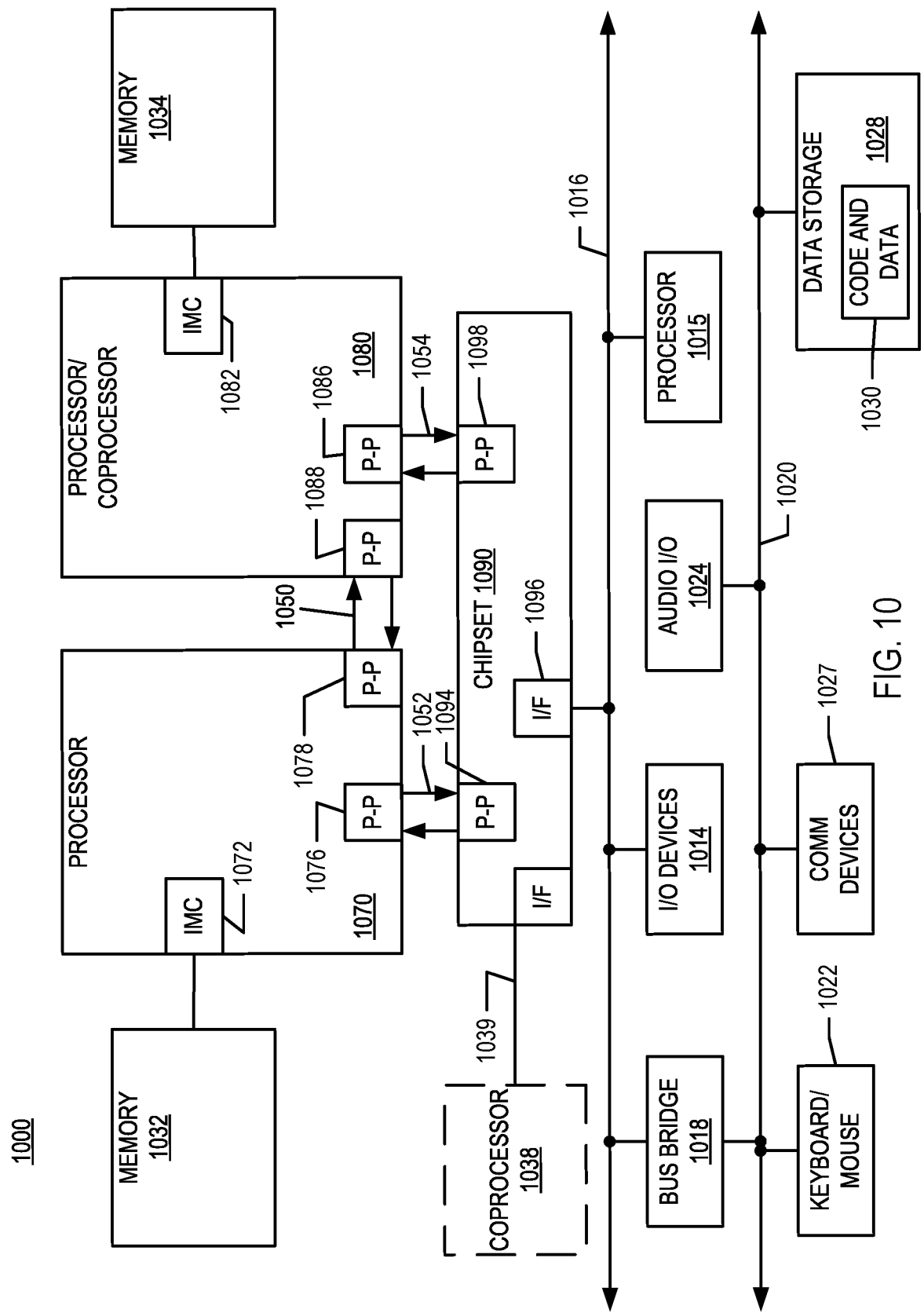

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 and coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
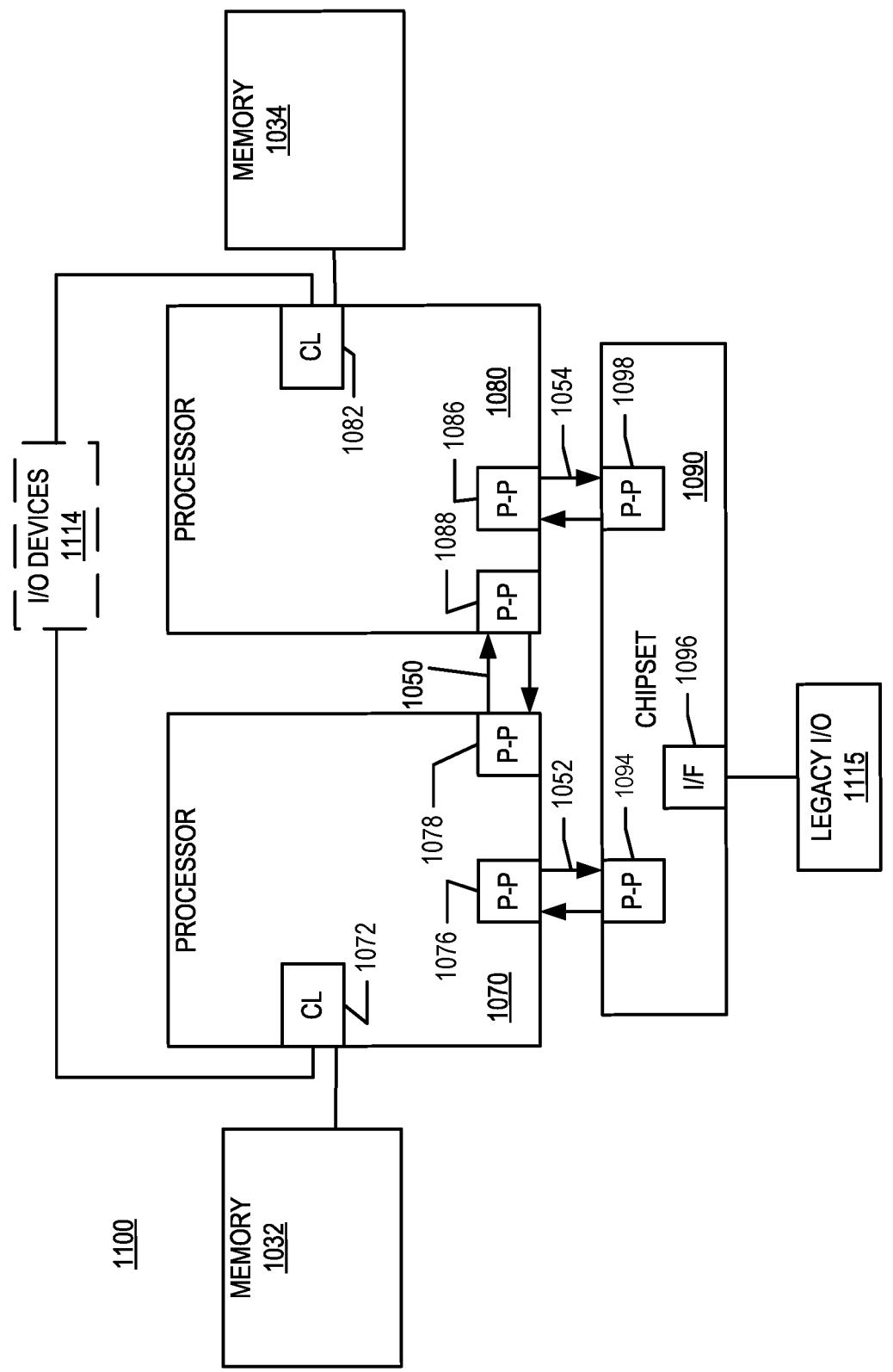

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller units and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
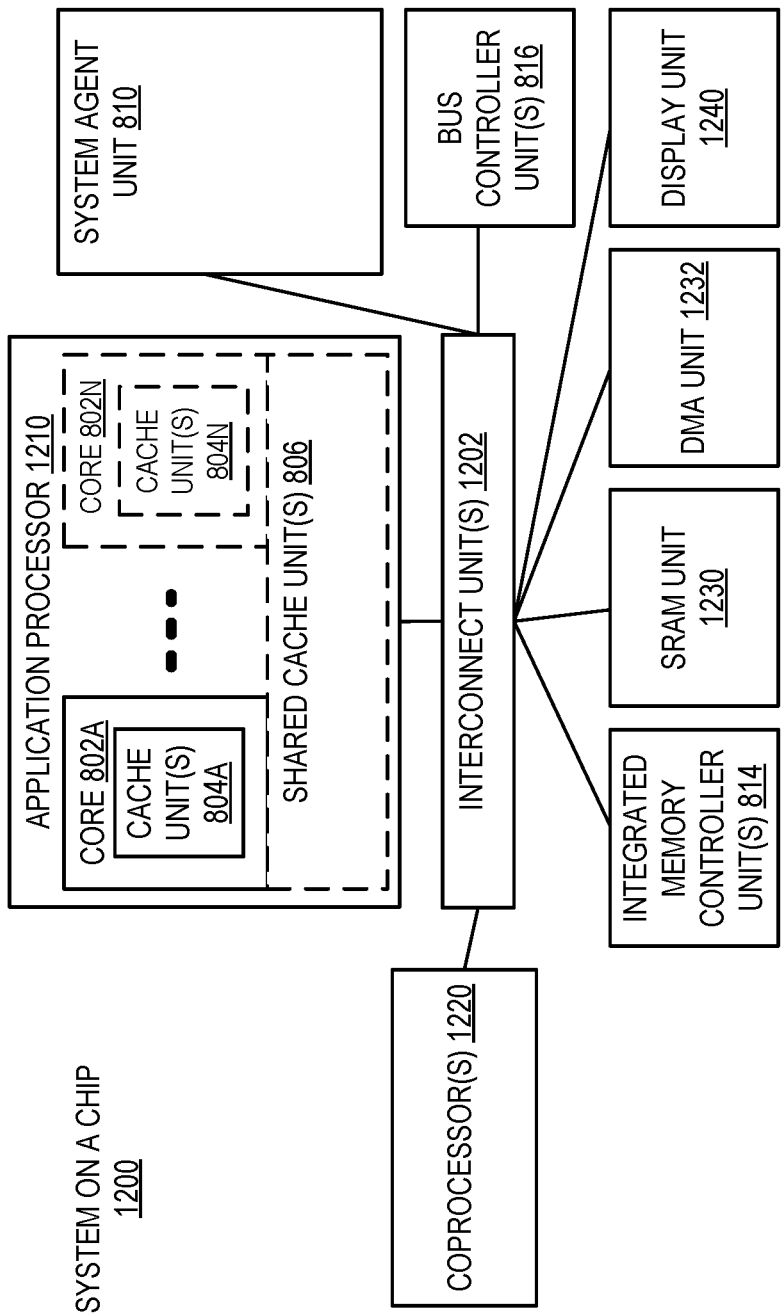

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect unit(s)

1202 is coupled to: an application processor 1210 which includes a set of one or more cores 802A-N, cache units 804A-N, and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code and data, such as code and data 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

We claim:

1. A hardware processor core comprising:
a hardware execution unit to execute a branch instruction;
at least two last branch record (LBR) registers to store source and destination information of a branch taken during program execution, wherein an entry in a LBR register is to include an encoding of the branch;
an architectural bit array to indicate which LBR register is architecturally correct;
a write bit array to indicate when an LBR register has been written; and
a plurality of top of stack pointers to indicate which LBR register in a LBR register stack is to be written.

2. The hardware processor core of claim 1, wherein the encoding of the branch is to indicate when the branch is a native instruction to instruction set architecture of the processor core.

3. The hardware processor core of claim 1, further comprising:
a binary translator to translate the branch instruction from a first instruction set architecture instruction to a second instruction set architecture instruction.

4. The hardware processor core of claim 3, wherein the first and second instruction set architectures are a same instruction set architecture.

5. The hardware processor core of claim 1, wherein the encoding of the branch is to indicate when the branch is a non-native instruction to instruction set architecture of the processor core.

6. The hardware processor core of claim 5, wherein the encoding is one of a conditional jump, near relative call, near indirect call, near return, near indirect jump, near relative jump, and far branch.

7. The hardware processor core of claim 1, wherein the entry in the LBR register is to include a polarity bit.

8. The hardware processor core of claim 1, wherein the hardware processor core is to support speculative execution.

9. The hardware processor core of claim 1, wherein the entry in the LBR register is to include a value that corresponds to which translated instruction was executed, an offset which is a physical address into a translated code cache, and an emulated native instruction pointer at the time of the branch.

10. A method comprising:
executing native instructions;
beginning a speculative block of code;
executing a branch in the speculative block of code;
writing information about the executed branch in a last branch record (LBR) according to a top of stack pointer and architectural bit settings that align with the top of stack pointer;
setting a corresponding write bit in a write bit array;
determining the speculative block of code is to commit;
exclusive ORing the write bit array with an architectural array and storing a result of the exclusive ORing in the architectural array;
clearing the write bit array; and
copying the top of stack pointer from a first top of stack register to a second top of stack register.

11. The method of claim 10, wherein the speculative block of code is denoted by an XBEGIN instruction.

12. The method of claim 10, wherein information about the executed branch includes an encoding of the branch and source and destination information of the branch.

13. The method of claim 10, wherein determining the speculative block of code is to commit is performed in response to an XEND instruction.

14. The method of claim 10, wherein the native instructions are X86 instructions.

* * * * *